Jan. 15, 1935.　　　H. C. FORD　　　1,987,674

DIFFERENTIAL GEARING

Original Filed Feb. 18, 1928

INVENTOR
Hannibal C. Ford
BY Walter J. Gill
ATTORNEY

Patented Jan. 15, 1935

1,987,674

UNITED STATES PATENT OFFICE 1,987,674

DIFFERENTIAL GEARING

Hannibal C. Ford, Kings Point, N. Y., assignor to Ford Instrument Company, Inc., Long Island City, N. Y., a corporation of New York Original application February 18, 1928, Serial No. 255,245. Divided and this application May 10, 1933, Serial No. 670,244

7 Claims. (Cl. 74—312)

This invention relates to epicyclic gearing and particularly to a type thereof which is free from known disadvantages present in differentials now commonly in use. Differentials of the usual types are subject to considerable back lash which, especially in instruments requiring great accuracy, must be eliminated to as great an extent as possible. Very satisfactory results in this line have been attained by use of an improved form of differential disclosed herein.

The subject matter of this application has been divided from my co-pending application on Fire control instrument, Serial No. 255,245, filed February 18, 1928, and any and all advantageous features which become manifest from the following description are, of course, to be understood as being part of the present invention.

Figure 1:
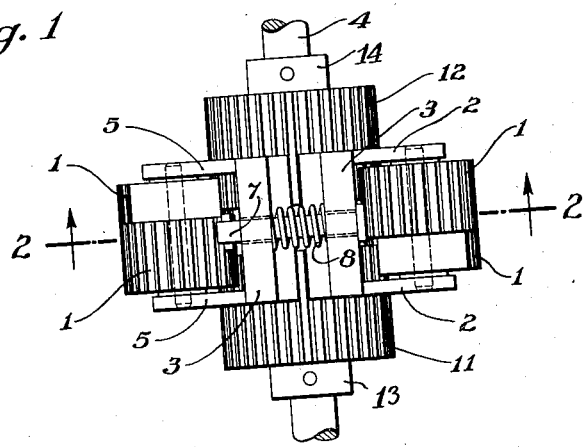
Fig. 1 is an external view of the improved differential.
Figure 2:
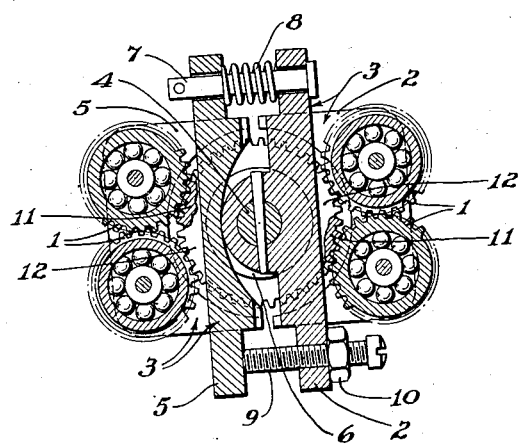
Fig. 2 is a view in section taken along the line 2—2 of Fig. 1.

In the preferred form, the differential comprises two pairs of gears 1, one pair of said gears being mounted on a member or yoke 2 forming part of the spider 3 and pinned to the shaft 4 and the other pair being mounted on a member or yoke 5 pivotally mounted on the shaft 4 by means of ears 6 through which the shaft passes. As shown in Fig. 2, the members or yokes 2 and 5 are connected at their upper ends by means of a pin 7 passing through openings in the yokes and having an enlarged head at one end and a pin at the other end. A spring 8 surrounds the pin between the ends of the yokes and tends to press them apart. At their other ends the yokes are controlled by an adjusting screw 9 threaded in the yoke 2 and bearing against the inner face of the yoke 5. When any adjustment has been completed locking nut 10 is tightened to hold the adjustment.

By turning the screw 9 to spread apart the lower ends of the yokes, the yoke 5 will turn about the shaft 4 with relation to yoke 2 to bring their upper ends closer together against the effect of spring 8. This brings the teeth of the upper gear 1 of each pair into more intimate engagement with the teeth of gears 11 and 12 to take out back lash between these gears and the gears of the spider. If the screw 9 be turned in the opposite direction the reverse operation will occur and back lash will be taken out by the lower gears 1 of the pairs being brought into more intimate engagement with gears 11 and 12.

The gears 11 and 12 are mounted rotatively on the shaft 4 on opposite sides of the spider of the differential, and are held from displacement axially of the shaft 4 by the spider and the collars 13 and 14 which are on and pinned to this shaft. Actuating forces may be applied to the differential in different ways. For example, in one of the uses to which the herein disclosed differential is put, the gears 11 and 12 are adapted to be independently driven, whereupon the gears 1 are rotated about their own axes and caused to turn about the axis of shaft 4 at one-half the speed that the gears 11 and 12 are turning thereabout, so that the spider and shaft 4 are similarly rotated, as in differentials generally, if the gears 11 and 12 are rotated unequally. If the gears 11 and 12 are turned equally in the same direction, the shaft 4 is correspondingly and equally turned, but if the gears 11 and 12 are rotated the same amount uniformly in opposite directions, the differential spider and the shaft 4 remain stationary. However, the shaft 4 and one of the gears 11 or 12 may have initiating actuations given to them, and the other of these gears will then have the resultant movement.

While the invention has been shown and described as embodied in a preferred form, it will be understood that various changes in its details may be made without departing from its principle as defined in the appended claims.

I claim:

1. In a differential, a shaft, coaxial main gears loosely mounted on said shaft, a spider between said gears and mounted to turn about the axis of said gears, secondary gears on said spider meshing with each other and with said coaxial gears, and means to shift certain of said secondary gears relative to others to reduce back lash in the differential.

2. In a differential, coaxial main gears, a shaft coaxial with said main gears, a member fixed on said shaft between said gears, secondary gears on said member meshing with each other and with said main gears, a second member between said main gears and swingable about the axis of said shaft, secondary gears on said second member meshing with each other and with said main gears, and means to shift said second member and the gears thereon relatively to the first member to bring certain teeth of said secondary gears into more intimate contact with the teeth of the main gears.

3. In a differential, a shaft, coaxial main gears loosely mounted on said shaft, a spider comprising two relatively angularly adjustable members extending between said main gears and mounted to turn about the axis of said main gears, one of said members being rigidly combined with said shaft, secondary gears on each of said members meshing with each other and with the main gears, and means to effect a relative shifting between said members to move the teeth of certain of said secondary gears into more intimate contact with the teeth of the main gears to take out back lash.

4. In a differential, two coaxial main gears, a shaft coaxial with said gears, a pair of secondary gears meshing with each other and with said main gears, a carrier for said secondary gears having a generally circular portion through which the shaft passes, a second pair of secondary gears meshing with each other and with the main gears, a carrier for the second pair of secondary gears comprising a member extending between said main gears said member being cut away at its center to receive said circular portion of the first carrier and having generally circular ears to receive said shaft and extending to each side of the circular member of the first carrier, and means to effect a relative shifting of said carriers to take out back lash.

5. In a differential, two coaxial main gears, a shaft coaxial with said gears, a pair of secondary gears meshing with each other and with said main gears, a carrier for said secondary gears having a generally circular portion through which the shaft passes, a second pair of secondary gears meshing with each other and with the main gears, a carrier for the second pair of secondary gears comprising a member extending between said main gears said member being cut away at its center to receive said circular portion of the first carrier and having generally circular ears to receive said shaft and extending to each side of the circular member of the first carrier and into circular recesses in said main gears, and means to effect a relative shifting of said carriers to take out back lash.

6. In a differential, two coaxial main gears, a shaft coaxial with said main gears, a set of secondary gears meshing with each other and the main gears, a carrier for said secondary gears comprising a member extending between the main gears and fixed on the shaft, a second set of secondary gears, a carrier for the second set of secondary gears and comprising a member extending between said main gears and mounted to turn about the axis of said shaft, and a spring tending to swing the second carrier in one direction from its central position with reference to the first carrier to take out back lash.

7. In a differential, two coaxial main gears, a shaft coaxial with said main gears, a set of secondary gears meshing with each other and the main gears, a carrier for said secondary gears comprising a member extending between the main gears and fixed on the shaft, a second set of secondary gears, a carrier for the second set of secondary gears and comprising a member extending between said main gears and mounted to turn about the axis of said shaft, a spring tending to swing the second carrier in one direction from its central position with reference to the first carrier to take out back lash, and means, including a screw, to turn the second carrier against the action of the spring to the other side of its central position to take out back lash.

HANNIBAL C. FORD.